(12) United States Patent
Jin et al.

(10) Patent No.: US 7,389,179 B2
(45) Date of Patent: Jun. 17, 2008

(54) REAL-TIME NAVIGATION SYSTEM FOR MOBILE ENVIRONMENT

(75) Inventors: Haiping Jin, San Jose, CA (US); Ruslan Adikovic Meshenberg, Santa Clara, CA (US); Salman Dhanani, Mountain View, CA (US); Alexander G. Glebov, San Jose, CA (US)

(73) Assignee: TeleNav, Inc., Sunnyvale, CA (US)

( * ) Notice: Subject to any disclaimer, the term of this patent is extended or adjusted under 35 U.S.C. 154(b) by 0 days.

(21) Appl. No.: 10/714,527

(22) Filed: Nov. 14, 2003

(65) Prior Publication Data

US 2004/0220726 A1    Nov. 4, 2004

Related U.S. Application Data

(63) Continuation of application No. 10/057,236, filed on Jan. 24, 2002, now abandoned.

(60) Provisional application No. 60/264,164, filed on Jan. 24, 2001.

(51) Int. Cl.
 *G01C 21/26* (2006.01)
(52) U.S. Cl. ...................................... 701/207
(58) Field of Classification Search ......... 701/200–201, 701/206–209, 211, 213; 455/414
See application file for complete search history.

(56) References Cited

U.S. PATENT DOCUMENTS

| | | | | |
|---|---|---|---|---|
| 4,953,204 A * | 8/1990 | Cuschleg et al. | ....... | 379/266.05 |
| 5,237,323 A | 8/1993 | Saito | ............................ | 340/995 |
| 5,528,248 A | 6/1996 | Steiner et al. | ................ | 342/357 |
| 5,543,789 A | 8/1996 | Behr et al. | .................... | 340/995 |
| 5,579,535 A | 11/1996 | Orlen et al. | ................. | 455/33.1 |
| 5,608,635 A | 3/1997 | Tamai et al. | ............. | 364/449.3 |
| 5,610,821 A | 3/1997 | Gazis et al. | ............... | 364/444.2 |
| 5,699,255 A | 12/1997 | Ellis et al. | .................... | 701/212 |
| 5,774,828 A | 6/1998 | Brunts et al. | ................. | 701/210 |
| 5,774,829 A | 6/1998 | Cisneros et al. | ............. | 701/213 |
| 5,838,562 A | 11/1998 | Gudat et al. | ........... | 364/424.02 |

(Continued)

FOREIGN PATENT DOCUMENTS

DE     196 21 424 A1    12/1997

(Continued)

OTHER PUBLICATIONS

Supplementary European Search Report, dated Nov. 14, 2002, for Application No. EP 00967228.

(Continued)

*Primary Examiner*—Thu V. Nguyen
(74) *Attorney, Agent, or Firm*—Morgan, Lewis & Bockius LLP

(57) ABSTRACT

A system and method for providing navigational information to a user connected in real-time, such as through a wireless telephone, PDA, or other device. The system provides navigational information to the user in the form most useful to the user, such as according to landmarks, or the number of blocks until the next action. The system also provides directions to points of interest along the user's route. Further, the system allows the user to suspend and resume a session. Also, the system varies the sampling rate at which the user's location is examined, to enhance efficiency and convenience.

26 Claims, 7 Drawing Sheets

U.S. PATENT DOCUMENTS

| | | | |
|---|---|---|---|
| 5,842,131 A | 11/1998 | Yamane | 455/456 |
| 5,884,218 A | 3/1999 | Nimura et al. | 701/208 |
| 5,902,350 A | 5/1999 | Tamai et al. | 701/211 |
| 5,904,728 A | 5/1999 | Tamai et al. | 701/211 |
| 5,910,177 A | 6/1999 | Zuber | 701/201 |
| 5,912,635 A | 6/1999 | Oshizawa | 340/988 |
| 5,922,042 A | 7/1999 | Sekine et al. | 701/211 |
| 5,928,295 A | 7/1999 | Geier | 701/29 |
| 5,928,307 A | 7/1999 | Oshizawa | 701/210 |
| 5,933,100 A | 8/1999 | Golding | 340/995 |
| 5,938,720 A | 8/1999 | Tamai | 701/209 |
| 5,938,721 A | 8/1999 | Dussell | 701/211 |
| 5,987,381 A | 11/1999 | Oshizawa | 701/209 |
| 6,014,090 A | 1/2000 | Rosen et al. | 340/905 |
| 6,021,371 A | 2/2000 | Fultz | 701/200 |
| 6,029,069 A | 2/2000 | Takaki | 455/456 |
| 6,055,478 A | 4/2000 | Heron | 701/213 |
| 6,070,123 A | 5/2000 | Beyer et al. | 701/209 |
| 6,107,944 A | 8/2000 | Behr et al. | 340/995 |
| 6,112,099 A | 8/2000 | Ketola | 455/466 |
| 6,115,700 A | 9/2000 | Ferkinhoff et al. | 706/13 |
| 6,148,261 A | 11/2000 | Obradovich et al. | 701/208 |
| 6,154,658 A | 11/2000 | Caci | 455/466 |
| 6,175,806 B1 | 1/2001 | Thuente | 701/213 |
| 6,175,807 B1 | 1/2001 | Buchler et al. | 701/220 |
| 6,199,045 B1 | 3/2001 | Giniger et al. | 705/1 |
| 6,205,400 B1 | 3/2001 | Lin | 701/214 |
| 6,208,295 B1 | 3/2001 | Dogan et al. | 342/378 |
| 6,243,657 B1 | 6/2001 | Tuck et al. | 702/150 |
| 6,266,615 B1 | 7/2001 | Jin | 701/213 |
| 6,269,306 B1 | 7/2001 | Ibrahim et al. | 701/214 |
| 6,321,161 B1 | 11/2001 | Herbst et al. | 701/210 |
| 6,401,035 B2 | 6/2002 | Jin | 701/213 |
| 6,405,123 B1 | 6/2002 | Rennard et al. | 701/200 |
| 6,501,956 B1 | 12/2002 | Weeren et al. | 455/463 |
| 6,539,080 B1 | 3/2003 | Bruce et al. | 379/88.17 |
| 6,580,904 B2 * | 6/2003 | Cox et al. | 455/456.2 |
| 2002/0151327 A1 | 10/2002 | Levitt | 455/556 |

FOREIGN PATENT DOCUMENTS

| | | |
|---|---|---|
| EP | 0 697 686 | 2/1996 |
| EP | 0 789 224 | 8/1997 |
| EP | 0 952 428 | 10/1999 |
| EP | 0 957 341 | 11/1999 |
| JP | 10325734 | 8/1998 |
| WO | WO98/45823 | 10/1998 |
| WO | WO99/27742 | 6/1999 |

OTHER PUBLICATIONS

International Search Report, dated Dec. 19, 2002, for International Application No. PCT/US02/02323, filed Jan. 24, 2002.

International Search Report, dated Mar. 26, 2001, for International Application No. PCT/US00/35075, filed Dec. 21, 2000.

International Search Report, dated Jan. 4, 2001, for International Application No. PCT/US00/27083, filed Sep. 27, 2000.

International Search Report, dated Jan. 12, 2001, for International Application No. PCT/US00/26921, filed Sep. 27, 2000.

* cited by examiner

INTERACTIVE REAL TIME DISTRIBUTED NAVIGATION SYSTEM

REAL-TIME NAVIGATION SYSTEM FOR MOBILE ENVIRONMENT

This application is a Continuation of application Ser. No. 10/057,236 filed on Jan. 24, 2002 now abandoned, which claims benefit of Provisional Application 60/264,164, filed Jan. 24, 2001.

FIELD OF THE INVENTION

This invention relates to navigation systems and location-based information delivery. Specifically, this invention relates to a method and system for an efficient operating environment for interactive and real-time navigation.

BACKGROUND OF THE INVENTION

The present invention relates to a system for providing navigational information to a user. The increasing use of portable appliances, such as wireless telephones and personal digital assistants (PDAs), has led to widespread use of such devices during travel. If and when such travelers become lost or otherwise need navigational directions, it would be very convenient and useful to receive such directions through their wireless devices.

A number of navigational systems are available or under development. Systems available over the internet allow users to receive directions from a starting point to a destination, and to receive an accompanying map. Such systems, however, do not provide real-time directions; once the user is on the road, the user cannot receive clarification or updates to the directions.

As used herein, "real-time" refers to an approximate correspondence with the actual time in which events are taking place. For instance, a user seeking real-time directions from the corner of Main Street and First Street seeks them at the approximate time the user is actually at Main Street and First Street.

As used herein, "navigational information" broadly refers to information relating to geographic navigation. In many instances, the navigational information comprises navigational directions to the user, instructing the user, for instance, which way and how far to go to reach a destination. In other instances, navigational information may refer to other navigation-related information, such as the user's current, past, or future location(s) or other information relating to the user's navigation.

Other systems are becoming popular for use in automobiles. Such systems often provide a graphical map or directions to the user. In some cases, these system employ satellite-based global positioning system (GPS) to identify the location of the vehicle. Examples of such systems are disclosed in U.S. Pat. Nos. 5,938,720; 5,928,307; 5,922,042; 5,912,635; 5,910,177; 5,904,728; 5,902,350; and 6,055,478, each of which is incorporated herein by reference. These systems, however, generally require specialized equipment in the vehicle, such as specialized input/output apparatus, graphical displays, a map database, or processor. Such equipment is expensive and cumbersome for the user, especially in those situations where the user is walking, changing vehicles, or otherwise away from the vehicle in which the equipment is installed. Therefore, there is a need in the art to provide navigation systems in personal handheld devices.

In addition, there is a need for wireless mobile devices, and mobile telephones in particular, to have location-identifying capability. Recent government regulations have highlighted the need for wireless carriers to provide such capabilities and services.

There are several technical obstacles that stand in the way of the incorporation of navigational capabilities in handheld devices for providing turn-by-turn real-time navigation services. One such obstacle is the amount of geographic data needed to provide reasonably detailed navigational information. Small handheld devices include, for example, cellular phones, personal digital assistants, or computers. The amount of embedded memory in such devices is limited and thus they are not suited for storage of large amounts of geographic information. Geographic information is usually stored in a geographic mapping database stored on a CD-ROM, hard-disk drive device or other large capacity storage medium.

Another obstacle is the lack of information processing power in small devices, such as those mentioned above. For example, the information processing power of a wireless telephone is typically provided by an embedded microprocessor with limited memory. While the information processing power of embedded microprocessors is generally increasing, such processors are still not suitable for processor intensive real-time navigational tasks.

An additional obstacle is the insufficient location accuracy provided by current technology. Initial sources of inaccuracy of the GPS based systems, for example, may be imposed by the U.S. Department of Defense through Selective Availability (S/A), while other sources of error are due to atmospheric and timing errors limiting the accuracy of a single GPS receiver to +/−50 meters. Methods exist that can be used to enhance the location accuracy to about +/−5 meters. Such methods include Enhanced GPS systems (i.e., SnapTrack) and network based system (i.e., Truepoint). These methods use a known position, such as a survey control point, as a reference point to correct the GPS position error. These methods of correcting GPS positions are referred to as Differential GPS or DGPS. The DGPS corrections can be applied to the GPS data in real-time using data telemetry (radio modems). Toward expanding the use of DGPS, the United States and Canadian Coast Guard are establishing a series of radio beacons to transmit the DGPS corrections for accurate navigation along the Great Lakes, the Mississippi River and tributaries, the Gulf Coast, and the Eastern and Western coasts of North America. However, such radio beacons are not available to consumers traveling in most inland locations. For the remainder of this application, the terms "GPS" and "DGPS" will be used interchangeably, unless indicated otherwise.

Navigational systems are difficult to develop further because the desired accuracy depends on the particular application. For example, if the user is driving in a downtown area with closely spaced streets, a GPS location with accuracy within, for instance, +/−50 meters is not adequate to give turn-by-turn directions. In this context, GPS location information is thus considered ambiguous and inappropriate for practical navigation. In other situations, providing a GPS location within +/−50 meters is, however, perfectly adequate for navigation purposes. For example, if a user is driving on a highway in a remote area without any nearby exits, the GPS location is sufficient for calculating further navigation directions. Thus, in such a situation, the GPS location is not ambiguous.

Current automobile GPS navigation systems make use of other sensors, such as accelerometers, speedometers, etc. plus sophisticated filtering technology to improve the accuracy of a navigational system (see, e.g., U.S. Pat. No. 5,912,635, previously incorporated by reference for all purposes). In addition, many automobile-based navigational systems use map-aiding technology as well. However, for a navigational system implemented using handheld devices, such as cellular telephones, it is undesirable to require the handheld device to be connected to external sensors, especially when the device is used while walking.

Other obstacles confront navigational systems designed for use when walking. U.S. Pat. No. 6,029,069, which is incorporated herein by reference, is an example of such a system. Such systems are generally limited by the user's communication device. For instance, it is difficult for a user to enter detailed information over a wireless telephone in a format that is useful for the central processor, especially if the user is engaged in other activities such as driving a vehicle. These systems are also susceptible to imperfections of the underlying service; for instance, establishing or maintaining a connection over the wireless network(s) can be difficult. Also, the rate of transfer of information over wireless networks can be extremely limiting.

Accordingly, it would be desirable to provide a navigational system and service which improves upon the inadequacies of prior systems.

SUMMARY

This invention is generally directed to method and system for providing navigational directions to a user. The user is connected to the system through a real-time connection, such as a wireless telephone, PDA, or other device. Generally, the system uses the capabilities of a central processor to conveniently and efficiently provide navigational directions to a user in real-time.

In one embodiment of the present invention, the user is able to suspend and/or resume the connection to the system. In some instances, navigational action, such as a turn, stop, check-in, or other action, will not be required for some time. In other instances, the requirements of the server, network, or user environment may require suspension of the connection. In some embodiments, the user is the connection is suspended at the user's request, or as a result of a loss of connection. In some embodiments, the user is instructed to resume the connection at some future time. That future time may be measured in units of time, or by other units such as mileage, number of blocks, or landmarks. To provide this functionality, the server is configured to store information from suspended sessions, and to recognize new sessions that are a resumption of a suspended session.

In another embodiment of the present invention, the call flow (which generally refers to the prompts to the user, whether via telephone or other communication medium) is determined from the uncertainty in the parameters needed to provide navigational information to the user. For instance, the system may select one call flow if the user's location in unknown, ambiguous, partially known, or known to a low level of certainty. The system may select a different call flow if the user's heading is unknown or ambiguous. Other call flows may be selected based on other uncertainties.

In another embodiment of the present invention, the system provides paced navigational directions to the user. For instance, the system may identify the cell-site in which the user is located, and provide navigational directions that are applicable while the user is in that cell-site. In another example, the system paces the navigational information based on the time or distance traveled by the user and/or the time or distance until the user's next anticipated navigational action. Alternatively, the system may only provide navigational information relating to an area corresponding to potential amount of error in the identification of the user's location.

In another embodiment of the present invention, the system provides navigational directions to an interim point of interest (POI). As the user travels from an initial location to an ultimate destination, it may be desirable for the user to detour to an interim point of interest. This POI may be selected by the user, or by the network, the system, or some other entity. The POI may be defined in any number of ways, e.g., "Pac Bell Park," "the nearest gas station," "200 Page Mill Road," "a police station," "public restroom," etc. If a number of locations potentially qualify as the POI (as in the case of, for instance, "the nearest gas station"), the system identifies potential interim destinations. One or more interim destination is then selected by various criteria, such as the deviation from the user's current path required to reach the potential interim destination(s). The user is then provided with navigational information relating to the interim destination.

In another embodiment of the present invention, the system provides navigational information to the user in speech format, including the names of streets. After generating the navigational information, a voice generator converts the navigational information from text format to speech format.

In another embodiment of the present invention, the system provides navigational information to the user in a format in which certain distances are expressed in terms of blocks, e.g "Two blocks down Castro Street, and then turn right."

In another embodiment of the present invention, the system varies the sampling rate for receiving location information from the user. In other words, the system varies the frequency with which it queries the user, either verbally, automatically, or otherwise, depending one or more selected factors. For instance, the system may check the user's location more or less frequently depending on factors such as the traffic on the wireless network, the number of users on the server or other factors affecting the server load, traffic conditions, the density of streets in the user's vicinity, the distance or time until the user's next navigational action, the user's speed, etc.

As will be appreciated by one of skill in the art, the present invention may be embodied as a method, data processing system, program products, wireless service, or component of a wireless service. Accordingly, the present invention may take the form of navigation systems, navigation methods, navigation devices, navigation software, components of a larger wireless network, etc. Software written according to the present invention is to be stored in a form of computer-readable medium, such as random access memory, hard disk memory or CD ROM, to be transmitted over a network, and executed by a processor.

For a better understanding of these and other aspects of the present invention, reference should be made to the following detailed description taken in conjunction with the accompanying drawings.

BRIEF DESCRIPTION OF THE DRAWINGS

In the drawings, which are not necessarily to scale.

DETAILED DESCRIPTION

The present invention is directed to a method and apparatus for providing navigational information to a user connected to the system through a real-time connection, such as a wireless network.

Figure 1:
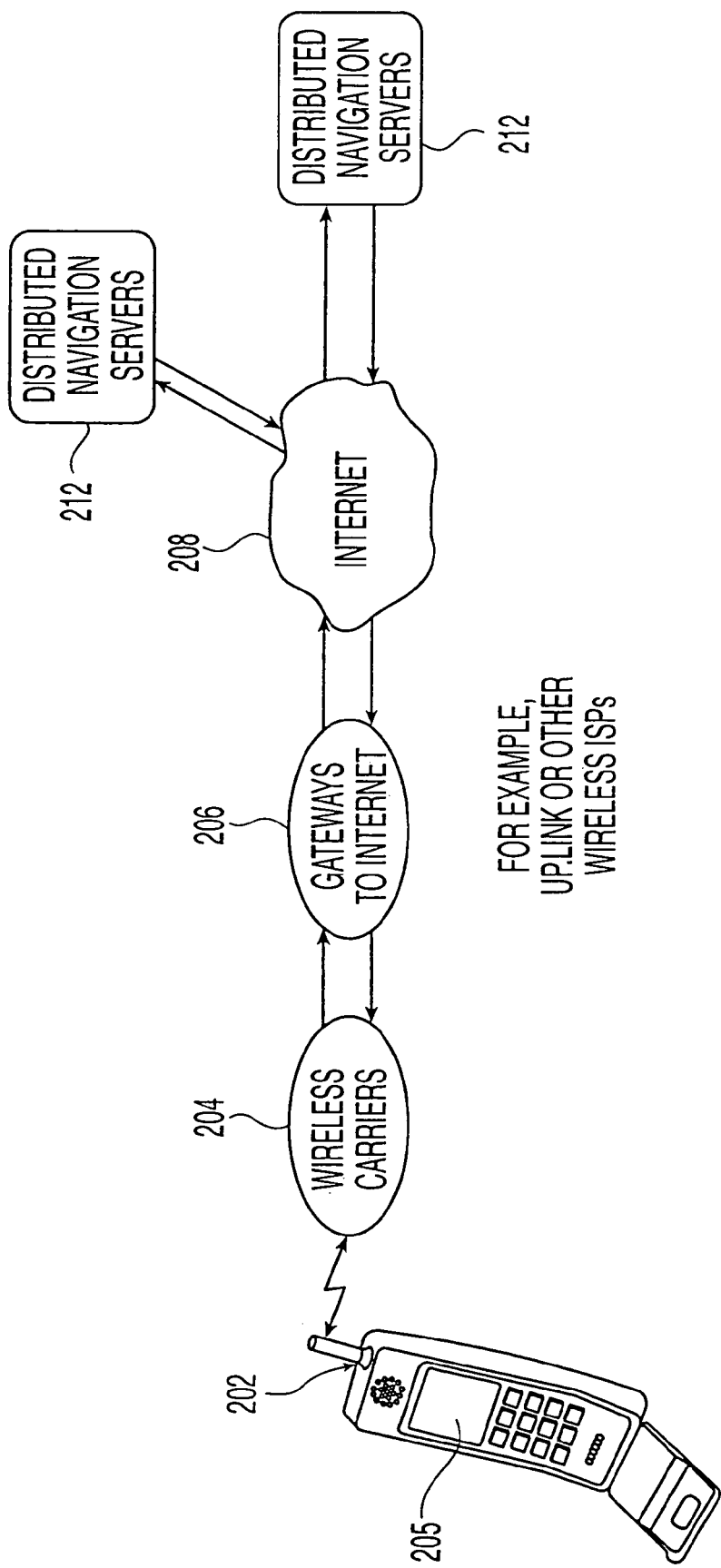
FIG. 1 is a schematic view of a system in accordance with one embodiment of the present invention, employing an internet connection between the navigation servers and the wireless network.

FIG. 1 shows an architecture for an interactive real-time distributed navigation system in accordance with a preferred embodiment. The various components and their interaction will now be described. It is to be understood that where like numerals are used in different figures, such like numerals refer to the same item. Wireless device 202 may take the form of a cellular telephone, satellite telephone, wireless Personal Digital Assistant (PDA), personal computer or other suitable device having wireless communications capability. Preferably, wireless device 202 is equipped with positioning capability that takes the form of, for example, global positioning systems (GPS), emergency 911 (E911) location, or others, including those that may become available in the future. Currently, various manufacturers produce wireless telephones, which may be enabled with the Wireless Application Protocol to present information to the user. In one specific embodiment, such telephones are appropriate for use as wireless device 202. Furthermore, PHONE.COM has at one time made a product called SDK, available for testing and modeling. That product and others like it may also be used within the scope of this invention. One skilled in the art will appreciate that the present invention is not limited to any particular positioning technology. In one embodiment, wireless device 202 is manufactured with built-in positioning capabilities. Wireless device 202 need not include map information, or may carry only a predetermined amount of map information, depending on the wireless device's 202 storage capability. Such a system is described as a distributed system and will be further discussed below.

In one embodiment, the capabilities of wireless device 202 are enhanced through interfacing with modular attachments. An essential function of wireless device 202 is to provide an interface between the navigational system of this invention and a user. In particular, wireless device 202 provides a user interface 205 for displaying graphical, textual or audible information. User interface 205 allows the user to make use of various sensory capabilities. In an exemplary scenario, a user perceives geographical markers or other stimuli. The user is then able to utilize this information using the system and method of the invention by providing appropriate inputs through user interface 205. User interface 205 can further provide instructions for completing a task where, for example, electro-mechanical components are involved. For example, where the navigation system of the present invention is incorporated within an automobile, an improved operation may necessitate moving the automobile to a certain position or direction. Through user interface 205, the user can receive specific instructions on how to move and position the automobile. Such interaction is used to improve the positioning accuracy of system of the invention, where interaction is achieved through text, graphics or audible signals. Various modifications using different human sensors will be apparent and are deemed within the scope of the invention.

Because wireless device 202 is capable of relaying information to a user by means of audible signals or through displayed text, some embodiments of this invention make use of audible sound producing devices and/or text displaying devices. Where a text displaying device is used, enhanced performance is achieved using a wireless device 202 capable of displaying, typically, several lines of text. An enhanced video display (not shown) may also be used with wireless device 202 for use in displaying maps and enhanced directional information. In another embodiment, wireless device 202 has incorporated within it gyroscopic or geomagnetical enhancements. Such enhancements can be used to provide real-time position and orientation information. One of skill in the art understands that many more enhancements are possible for wireless device 202 without deviating from the teachings of the invention.

As further shown in FIG. 1, wireless carrier 204 provides wireless connectivity between wireless device 202 and distributed navigation servers 212 to be described below. In an embodiment of the invention, WINDOWS NT servers are used as the operating platform. Examples of wireless carrier 204 include, for example, wireless telephone carriers (regardless of operating frequency), internet service providers with remote-communication capability, satellite communications carriers, and global positioning system carriers. In achieving wireless connectivity, wireless carriers provide an existing infrastructure for the wireless devices and distributed navigation servers. In one embodiment, GPS is used along with the government imposed selective availability. One with skill in the art will understand that where such limitation is removed, the present invention can further be enhanced. Because of the adaptive interaction with the user, information ranging from general to very specific is relayed to the user for a wide range of navigational applications.

While keeping within the teachings of the invention, wireless carrier 204 provides positioning information (which may also be referred to as measurement information) such as through GPS, E911 or other positioning systems. In addition, positioning information may be obtained through a third party and is then used by wireless carrier 204. For example, wireless service resellers, wireless internet service provides (ISPs), or satellite wireless carriers, among others, provide services which can be implemented in embodiments of the invention. Importantly, wireless throughput and bandwidth continues to increase through the advent of digital transmission and through other techniques. Analog (i.e., AMPS) systems provide for a certain level of service. However, more advanced digital transmission techniques, such as, but not limited to GSM, TDMA, CDMA, provide higher data throughput. Because of its broad application, the present invention is appropriate for these and many other transmission techniques. In an embodiment of the invention, wireless carrier 204 receives analog or digital information from the wireless device 202 and directs such information to other components of the system of this invention, such as server 212. Similarly, wireless carrier 204 receives information from components of the invention such as server 212 and then directs such information to wireless device 204. Moreover, the method and system of the present invention, or components thereof, may be incorporated as elements of the wireless network itself, within the scope of the present invention.

As shown in FIG. 1, wireless carrier 204 is connected to gateway 206 which provides an interface to network 208. In general, gateway 206 is a network point that acts as an entrance to another network and is provided by, among others, wireless carriers, ISPs, or other telecommunications providers. In an embodiment of the invention, network 208 is the internet. The internet provides advantages because, among other things, it is a widely distributed network reaching many areas of the world. In another embodiment, network 208 is implemented as a proprietary communications network. For example, by utilizing specialized communications network connections, network 208 may be customized to provide minimal latency and optimal performance.

As illustrated in FIG. 1, in accordance with a preferred embodiment, one or more distributed navigation servers 212 form part of the system of the invention and communicate with its other components using communications network 208. In a preferred embodiment distributed navigation servers 212 store street map information and point of interest information and further perform processing tasks. In this manner, the wireless device 202 is not burdened with carrying all the necessary information for proper navigation. In an embodiment, distributed navigation servers 212 also process location-specific information, such as real-time traffic information. In an embodiment, traffic information is obtained from a group of navigation service users. By observing and comparing their positions, speeds and times, and making further comparisons with nominal street speed limits in a map database, real-time traffic information is generated and then used by the invention. Examples of suitable map databases include, for example, those provided-by TELCONTAR with its "DRILL DOWN SERVER", QUALITY MARKETING SOFTWARE with its "GEOSTAN LIBRARY", and NAVTECH with its digital map products. Furthermore, examples of suitable traffic information providers include, for example, ETAK, TRAFFICSTATION.COM and METROWORKS. In a preferred embodiment, at each juncture towards a destination, the system dynamically determines the optimal route for a particular user responsive to ever changing conditions. For example, where due to changed conditions a first route becomes less optimal, a second route is generated and presented to a user. An optimal route is determined in several ways depending on a user's preference. For example, an optimal route can be based on minimum time, minimum distance or minimum consumption of fuel. Processor intensive functions, such as navigation guide algorithms, are processed by distributed navigation servers 212 so as to reduce the computational burden on wireless device 202. As part of the processing function of distributed navigation servers 212, in an embodiment, these servers provide conversion functions such as between HDML or WML to HTML and vice versa.

Figure 2:
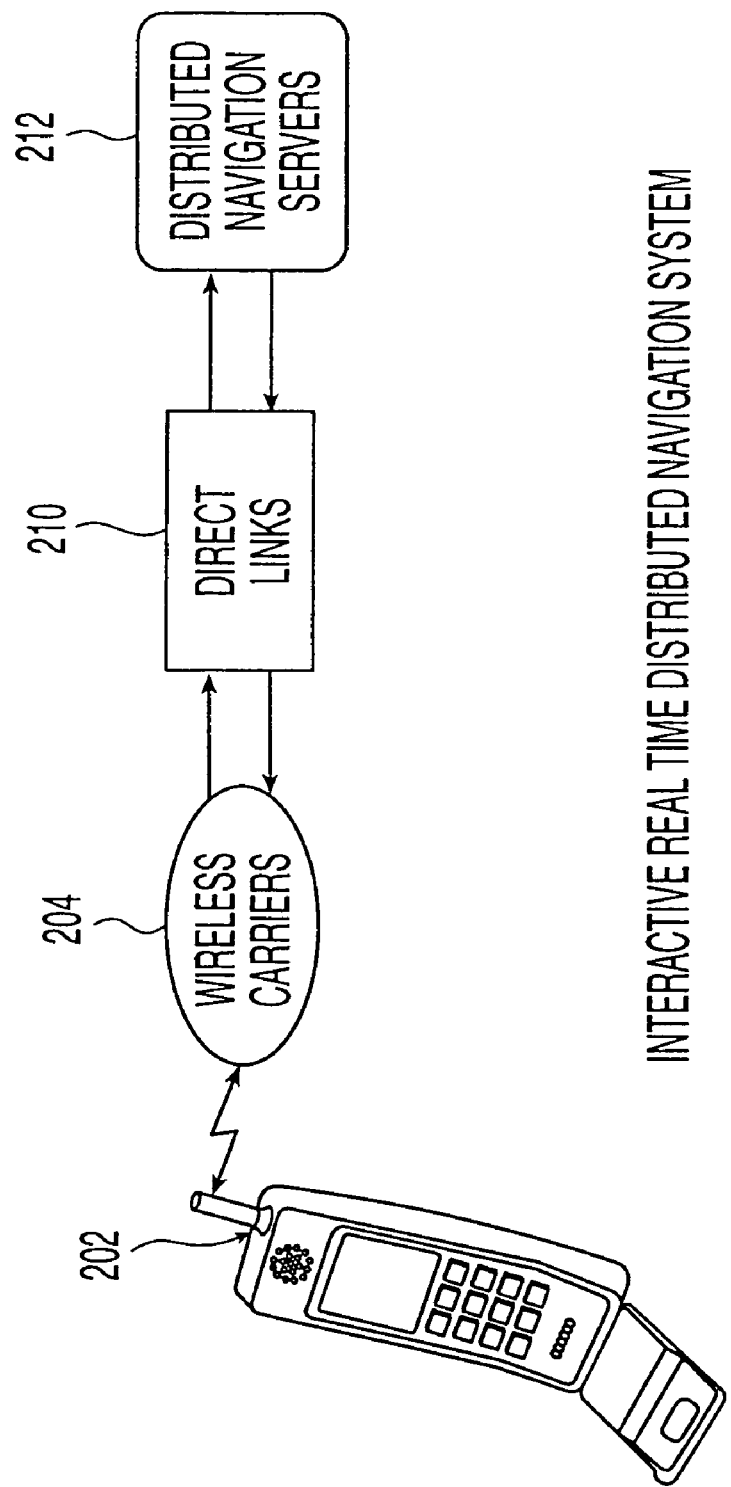
FIG. 2 is a schematic view of a system in accordance with another embodiment of the present invention, employing direct connections between the navigation servers and the wireless network.

An alternative embodiment for the system architecture of the present invention is shown in FIG. 2. As illustrated in the figure, wireless device 202, wireless carrier 204 and distributed navigation servers 212 are substantially the same as described for FIG. 1. Direct links 210, however, provide an alternative embodiment to the function of gateway 206 and network 208 of FIG. 1. The direct link architecture is applicable where Internet infrastructure is not well established or fast response is desired for user navigation or other location specific information services. Illustratively, T1, Frame Relay, etc. linked by a LAN or WAN are appropriate for direct links 210. In another embodiment, direct links 210 are implemented as dedicated lines. Alternatively, direct links 210 are implemented as hard wired connections between wireless carrier 204 and distributed navigation servers 212 where wireless carrier 204 and distributed navigation servers 212 are collocated in a central office.

In some embodiments, the system of the present invention utilizes a pool of information including map, geographical, personal and location information to construct an efficient environment for users of the invention. The present invention includes techniques for improving the operating environment of a navigational system, as described below.

In accordance with one embodiment of the invention, the Wireless Markup Language (WML) in the Wireless Application Protocol (WAP) is used by the system and method. WML in the WAP is the analogue to HyperText Markup Language (HTML) in Internet Protocol (IP). WML is defined in "WAP WML" as maintained by the WAP Forum and accessible at www.wapforum.org. Of course, the present invention is not limited to any particular programming language or protocol.

Figure 3:
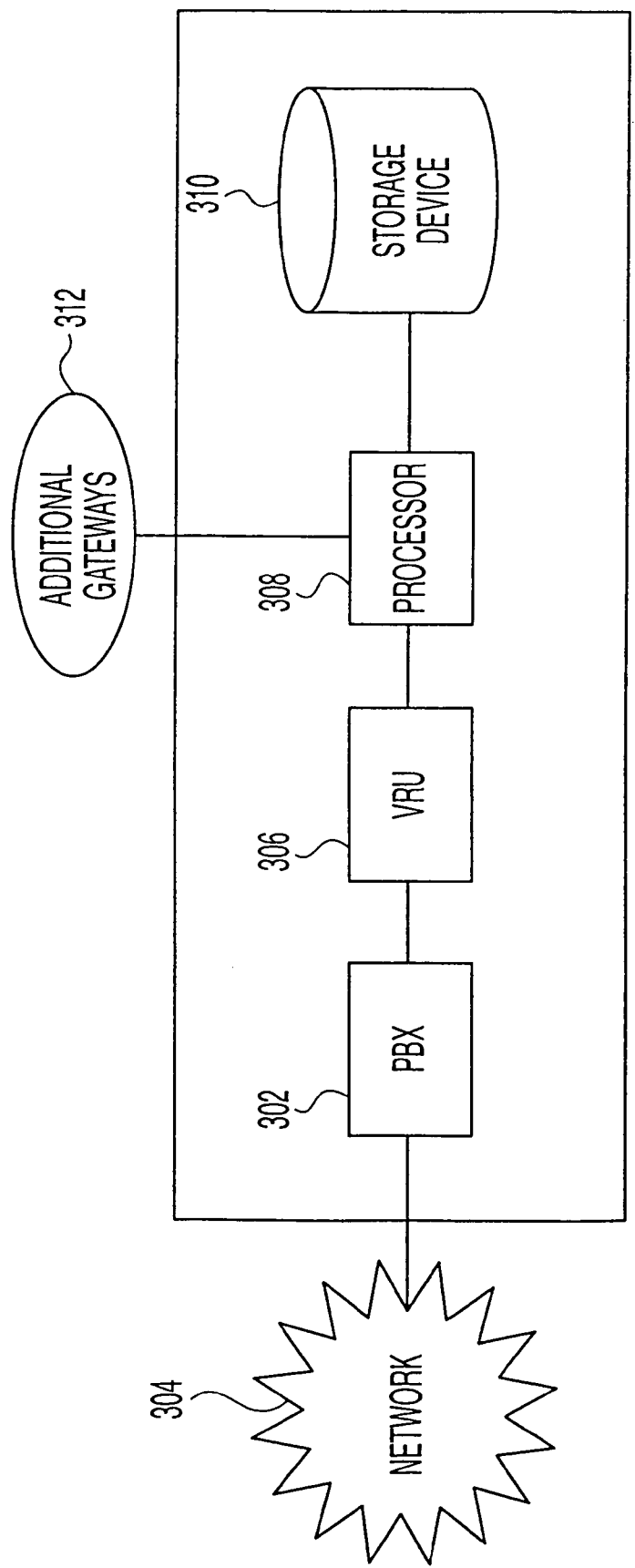
FIG. 3 is a schematic view of a server configuration in accordance with one embodiment of the present invention.

FIG. 3 is a schematic diagram of a distributed navigational server 212 of the present invention. Generally, the server 212 comprises an interface 302 connected to the communication network 304 through which the server is connected to the user. The interface may be a PBX, modified PBX, or other switch known in the art. Broadly speaking, the interface 302 is connected to a voice response unit (VRU) 306 for receiving and/or conveying information to the user through the communication network 304 in speech format. The VRU 306 preferably includes voice-recognition capability and voice-generation. In particular, specialized voice-recognition and/or voice-generation may be employed to process the specialized vocabulary associated with navigational directions, as discussed in more detail below. The VRU in turn is connected to a processor 308. This processor 308 is configured to perform a large number of functions, with the broadly stated end result that the processor receives information from the user, processes the information, and delivers navigational information or related queries, prompts, or other information back to the user. A more specific description of the processor design is provided below. The processor is connected to a storage device 310. This device may store the various data needed by the processor, such as map information, customer information, and other operational information. The processor may also be connected to one or more additional gateways 312. These gateways may provide the processor with various third party information, such as traffic information, customer information, GPS information, or information relating to the communication networks. Of course, the components and structure shown in FIG. 3 are merely exemplary. Additional components or configurations could also be employed within the scope of the present invention. Further, the components could be employed in different form. For instance, the VRU or storage device could physically be components of the processor, or could be connected through external gateways. Likewise, the VRU or other components could be connected directly to the storage device, gateways, or other components. These and other variations will be apparent to those of skill in the art.

As mentioned above, the method and system of the present invention may employ specialized voice-recognition equipment and/or techniques. In particular, the server 212 may receive information from the user in the form of street names, city names, states names, or other proper nouns. Many of these names are difficult to recognize. Specific programming regarding various city names, state names, and other navigational vocabulary and/or syntax is employed to allow the system to recognize the specialized vocabulary associated with navigation.

Similarly, the present invention may employ specialized voice-generation equipment and/or techniques. Because of the specialized vocabulary associated with navigation, typical voice-generation devices may have difficulty converting navigational information into speech format. The present invention may equip these devices with additional vocabulary. In particular, the present invention may employ a database of sound files, preferably in ".wav" format or equivalent, corresponding to street names, city names, etc.

Figure 4:
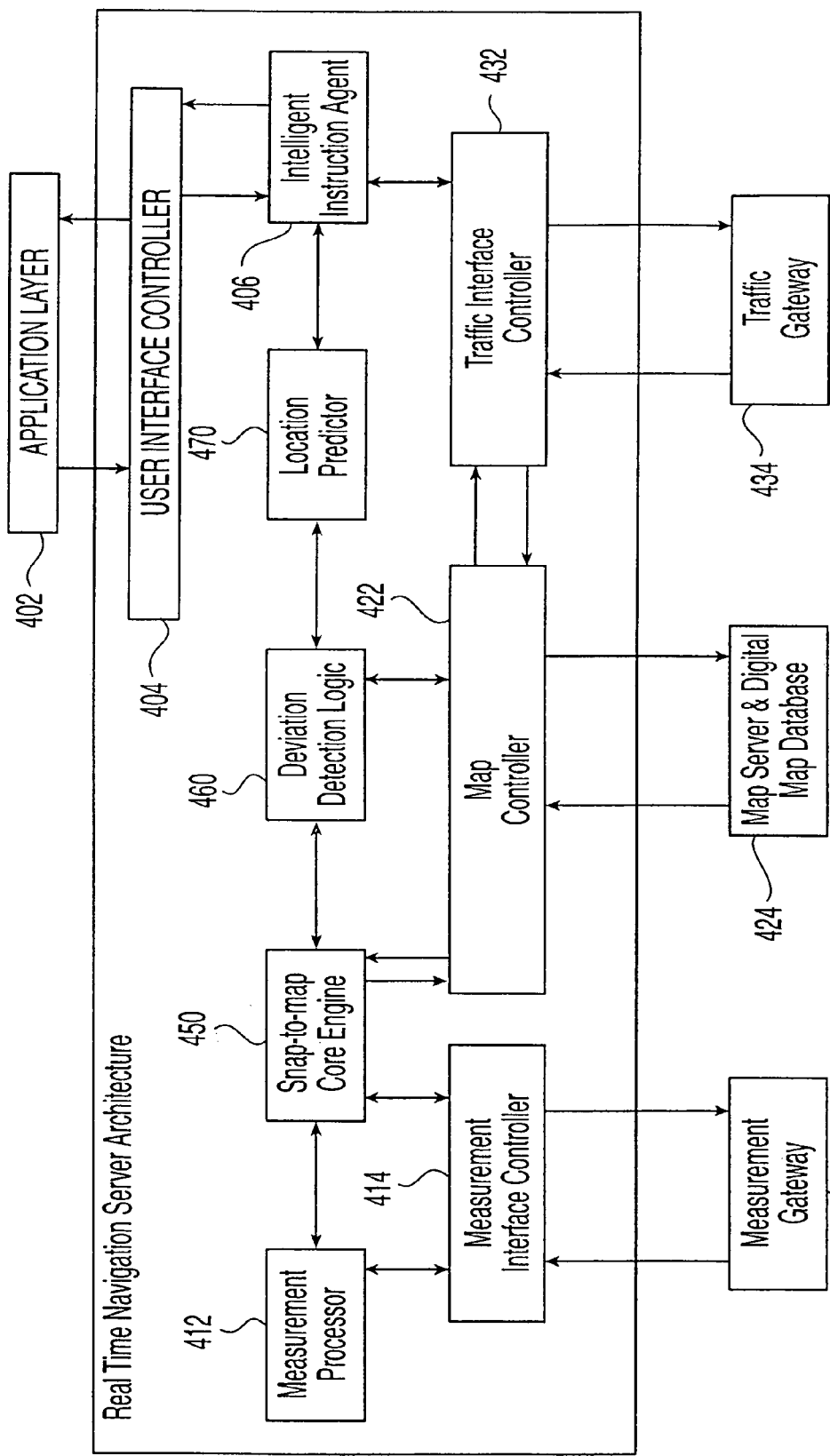
FIG. 4 is a schematic view of a server configuration in-accordance with one embodiment of the present invention.

FIG. 4 is a more detailed schematic of a navigation server 212 in accordance with one embodiment of the present invention. The configuration shown in FIG. 4 is a different, but equivalent, description of the server than the configuration shown in FIG. 3. The user connects to the server 212 through the application layer 402. This application layer preferably translates user input into a form usable or preferred by the server 212. Inside the server, a subprocessor, which is referred to as the User Interface Controller 404 in the preferred embodiment, controls interaction with the user, such as receiving information like user instructions or the user's destination, and conveying instructions, prompts, or other information to the user. This information is passed to and from a subprocessor, which is referred to as the Intelligent Instruction Agent 406 or User Interaction Engine in the preferred embodiment. This Intelligent Instruction Agent 406 receives information, such as the user's location and traffic information, from which it generates instructions to the user.

As shown in FIG. 4, a number of functional components are preferably involved in providing information to generate instructions to the user. A subprocessor, which is referred to in the preferred embodiment as a Measurement Processor 412, receives measurement information from a controller component, referred to in the preferred embodiment as the Measurement Interface Controller 414. This measurement information may include various data regarding the location of the user, such as GPS, Cellular Digital Packetized Data (CDPD), U.S. Wireless (USW)(fingerprint technology), and @road (using CDPD company) information. In many instances, the measurement information comprises the longitude and latitude of the user, obtained through GPS or similar capability. The Measurement Interface Controller receives measurement information from one or more Measurement Gateways 416. To perform these operations, the Measurement Processor 412 and/or the Measurement Controller 414 may receive information from the Intelligent Instruction Agent 406 including, for instance, information relating to the sampling rate for gathering measurement information, as discussed in more detail below.

Further, as shown in FIG. 4, a subprocessor, referred to in the preferred embodiment as the Map Controller 422, sends and receives information to and from a database of map information, referred to in FIG. 4 as the Map Server and Digital Map Database 424. For example, the Map Controller 422 may convey the user's location and destination to the Map Server and Digital Map Database 424, and/or may receive a nominal route and surrounding map from the Map Server and Digital Map Database 424. The Map Server and Digital Map Database 424 preferably correlates the measurement information into more useful navigational information. For instance, the measurement information may comprise latitude and longitude for the user (derived from, for instance, GPS), and the Map Server and Digital Map Database 424 may correlate that latitude and longitude to a map location such as an address, street location, cross street, landmark, etc. In some embodiments, the Map Server and Digital Map Database 424 may calculate a route for the user, or a number of potential routes for the user.

Also, as shown in FIG. 4, a subprocessor, referred to in the preferred embodiment as the Traffic Interface Controller 432, interfaces with one or more Traffic Gateways 434. Generally, the traffic interface controller 432 may receive nominal route information for the user from the Intelligent Instruction Agent 406, and pass nominal route information to the traffic gateway (s) 434. The interface controller 432 may receive traffic information, including alerts regarding the user's route, from the traffic gateway(s) 434, and provide such information to the Intelligent Instruction Agent 406. Traffic information may be obtained from various services known to those of skill in the art, including those discussed listed above, or may be generated by information gathered from a plurality of users of the system.

The information gathered is provided to a number of logic elements. As shown in FIG. 4, a subprocessor, referred to in the preferred embodiment as the Snap to Map Core Engine 450, provides certain processing functions. In the preferred embodiment, the Core Engine 450 may perform functions such as providing information or instructions to the measurement interface controller 414 regarding the rate at which to provide measurement information. It may receive measurement information (which in some embodiments is processed by the measurement processor 412) from the measurement interface controller 414. It may provide user information, such as the location and destination of the user, to the map controller 422, and receive a nominal route and/or map information from the map controller 422. Further, the core engine 450 may process the received information to generate navigational information, such as a location, route, alert, instruction, or other related geographical information.

Generally, the core engine 450 may use a number of algorithms to perform various tasks. The core engine 450 finds the most likely location of the user based on information including the measurement information (e.g., latitude and longitude), map information, and possible location information and possible routes provided by the map server and database 424. To do this, the core engine 450 may employ various technologies, including, for example, navigational technology, information theory, stochastic analysis, estimation theory, statistical hypothesis theory, control theory, game theory, and artificial intelligence.

Another logic element that may be employed in the preferred embodiment is the deviation detection logic 460, as shown in FIG. 4. This component preferably receives navigational information from the core engine 450, and determines if the user is in the correct location and/or on the correct course. The deviation detection logic 460 may send or receive location information or map information to or from the map controller 422 to make this determination. Further, the deviation detection logic 460 may forward its determination, or other information, to other components.

Yet another logic element that may be employed in the preferred embodiment is another subprocessor, referred to in the preferred embodiment as the location predictor 470. Preferably, this element estimates the user's location at a given time, based on the determination of the user's location at an earlier time. For instance, if the core engine 450 received measurement information regarding the user, such as the longitude and latitude of the user, as of the noon, there may be a need to predict the user's position as of the time noon+10 sec (ten seconds after noon). In that situation, the location predictor may extrapolate upon the measurement information (or other navigational information, such as a street location) of the user as of noon, to estimate the user's location as of the time noon+10 sec. This functionality compensates for latency or gaps between reception of measurement information, or may make the system more responsive to user requests for information. For instance, if the user requests an update on the user's location or navigational information at time noon+10 sec, but the measurement processor 412 is not scheduled to update measurement information until the time noon+20 sec, the location predictor can generate updated information without the need to seek measurement information ahead of schedule.

Of course, the specific components shown in FIG. 4 are simply one embodiment of a system in accordance with the present invention. Numerous variations could be made within the scope of the present invention. For instance, many of the subprocessors, logic elements, controllers, engines, and other components could be combined, configured differently, or even omitted. Further, many of the functions performed by the components shown in FIG. 4 could be performed by other components, performed by components outside the server 212, or in some cases omitted, within the scope of the present invention.

In operation, the system preferably manages the timing of the receipt of measurement information, which may be referred to as the sampling rate. The benefits of such management can be seen from a review of the process by which measurement information is obtained. Preferably, measurement information is obtained from the user's wireless device. For instance, the measurement information may be received from a GPS component of a wireless telephone, PDA, or other appliance. Such a component is sometimes referred to as position determination equipment (PDE). Measurement information may comprise latitude and longitude, and may also comprise other information such as the user's speed, heading, or error statistics. Retrieval of the measurement information, therefore, may be performed in various ways. For instance, the measurement information may be retrieved periodically in set periods, such as every ten seconds. Alternatively, the measurement information may be retrieved at periods of varying length, depending on various factors such as the network/carrier load, the type of network/carrier, the geography surrounding the user, the type of wireless device employed by the user, the user's subscription information, etc. In the preferred embodiment, measurement information is retrieved when the user first appears in the system, in an initialization process, and at certain periods thereafter.

A system in accordance with one embodiment of the present invention therefore manages the sampling rate. A logic element within the system, such as the core engine 450, determines or selects a sampling rate based on one or more factors. For instance, one factor may be the desire (or need) to minimize the number of times measurement information is retrieved from the user's wireless device, in order to conserve the battery of that device, or to minimize the user's use of network capabilities. Another factor may be the desire to minimize the load or usage on the server or network. Another factor may be the geographic environment surrounding the user, e.g., a lower sampling rate may be used if the user is not expected to make any turns in the immediate future, or if there are few streets or other landmarks in the vicinity of the user, or along the user's expected route, etc. This factor may dictate different sampling rates for, e.g., dense downtown areas, less crowded areas, or long distance travel. On the other hand, the sampling rate is also chosen with an eye toward achieving the best possible performance. Further, the sampling rate may depend at least in part on user-specific information, such as the subscription plan of the user to the service or to the user's wireless, internet, or other service provider. In one embodiment, typical instances in which the server checks measurement information for the user include times when the user is (or should be) at a location that can confirm that the user is on the nominal route, times after the user has taken navigational action, and times where possible deviation from the nominal route is anticipated.

In one embodiment of the present invention, the application layer 402 comprises a media adaptation layer. This media adaptation layer adapts input and output to the server 212 according to the localized factors, such as different language or other formats, or the presentation medium called for by the user's wireless device. For instance, the user input may be in a number of formats, such as voice, web, WAP, hypertext markup language (HTML), extensible markup language (XML), wireless markup language (WML), or other data formats. Alternatively, the user may be speaking a different language. The media adaptation layer preferably comprises a logic element that transforms user input into a format useable for the server. Similarly, the media adaptation layer preferably comprises capability to transform the server output into the format or medium suited for the user or the user's equipment. The media adaptation layer may be configured, for instance, as part of the application layer, another gateway 312, or a component of the server 212.

Figure 5:
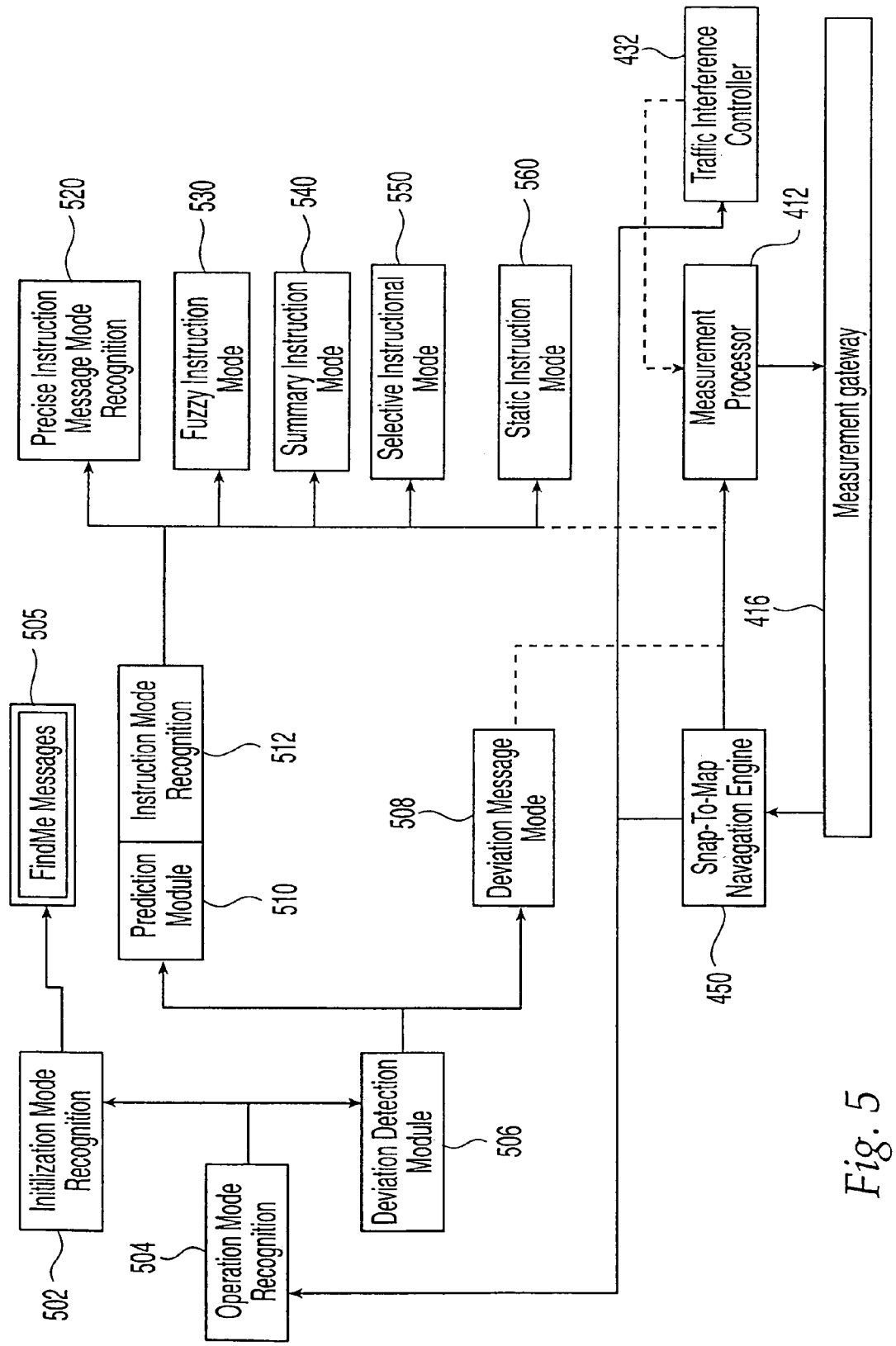
FIG. 5 is a schematic view of the intelligent instruction agent of FIG. 4.

FIG. 5 shows a more detailed schematic of one embodiment of the intelligent instruction agent 406 described in FIG. 4. This logic element generally selects instructions or prompts for the user. As described above, information generally flows to the intelligent instruction agent 406 from the core engine 450, the measurement gateway 416 (under control of the measurement processor 412), and the traffic interface controller 432. As shown, information is also exchanged between those components. For instance, information regarding traffic conditions may be passed from the traffic interface controller 432 to the measurement processor 412. The nominal route and current location for the user may be provided to the traffic interface controller 432 or the measurement processor 412.

Preferably, this information is received at the operation mode recognition element 504. Based on the available information, which may include user inputs and other information regarding the trip status, the operation mode recognition element 504 determines whether the user's location has been identified. If the user has not be located, the initialization mode recognition element 502 is triggered. The initialization mode recognition element 502 prompts the user for location information. In the preferred embodiment, such prompts are referred to as Findme messages 505. Examples of these messages include asking the user for streets and cross-streets. U.S. Pat. No. 6,266,615, which is incorporated herein by reference, describes such a process.

If the user has been located, the deviation detection module 506 is preferably triggered. This module determines if the user has deviated from the nominal route. That determination is based on the nominal route solution generated or provided by the core engine 450, as well as other information such as other possible candidate routes. The amount of deviation may be based on the error or uncertainty in the user's location. The determination of whether a calculated deviation is acceptable is based on factors such as the type of PDE employed by the user, as well as user input.

If deviation is detected, the deviation message mode 508 is preferably triggered. In this mode, the user is informed of the calculated deviation. The user may be given a menu of possible responses, such as asking to be re-routed, asking the system to ignore the deviation or to otherwise leave the user alone, denying that the user is deviated from the route, or simply stating that the user does not know. Of course, many variations of this, and other, portions of the call flow may be employed within the scope of the present invention.

If deviation is not detected, the prediction module 510 and the instruction mode recognition module 512 are preferably triggered. The prediction module generally analyzes the deviation and the uncertainty in the determination that the user has deviated from the nominal route. For instance, this uncertainty may be due to latency in the connection(s), the sampling rate of measurement information, or the error size. The instruction mode recognition module 512 selects one or more modes for further processing. This selection is preferably based on factors such as the uncertainty in the calculated location information for the user, the features in the vicinity of the nominal route for the user, and user input. Preferably, the instruction mode recognition element 512 selects one or more of five modes.

As shown in FIG. 5, the first mode is the precise instruction message mode recognition element 520. In this mode, the user may be given any number of relatively precise instructions. For instance, the user may be given an information message, such as the distance to the next turn, measured in blocks, mileage, time, or according to landmarks, or other information to assist the user in navigation. The user may be given an alert message, such as a message alerting the user to the speed limit, cross street, or other useful warning. The user may be given some sort of preparation message, such as a message to prepare to change lanes, or a warning that a given street is the last cross street before some location or action. The user may be given an action message, such as a message instructing the user to take a certain turn, or to take a series of turns or actions. Also, as will be discussed in more detail below, the user may be instructed or given the option to suspend the call.

The second mode is the fuzzy instruction mode 530. Preferably, this mode is selected if the identification of the user's location is ambiguous. The user is provided with a multiple information message, such as a message reflecting the uncertainty in the user's location. For instance, the user may be instructed to turn within a range of times or distances, or may be instructed to look ahead for landmarks or cross-streets, etc.

The third mode is the summary instruction mode 540. Preferably, this mode is selected if the user has requested a summary of the trip. The user is provided with an overview of the trip, including, for instance, the number of actions and time of the actions taken by the user, the major highway connections, and other details of the trip.

The fourth mode is the selective instruction mode 550. This mode is preferably selected due to uncertainty in the user's heading or inability to precisely locate the user due to, for instance, the street density in the immediate location of the user. The user is provided with a selective instruction message, such as a message regarding multiple possible scenarios. For instance, if the system has located the user but is unsure which of two routes to the destination the user prefers, the user may be instructed as follows: "if you turn left on Page Mill Road, then follow it for two blocks and turn left onto El Camino; if you turn right on Page Mill Road, then follow it for three blocks and turn right onto Sand Hill Road."

The fifth mode is the static instruction mode 560. This mode is preferably selected if suitable measurement information for the user is not available. This may happen if, for instance, the user's carrier is not functioning, the user is traveling in an area in which no suitable carrier is available, or the server's request to the measurement gateway 416 has otherwise timed out. In this circumstance, the user is simply given a recitation of the remaining route.

Of course, the specific elements and configuration shown in FIG. 5 are merely exemplary. In particular, the names given for the various modes, messages, and other elements, are merely labels, and other elements could performing the same roles could be substituted in accordance with the present invention. Moreover, the configuration and connections shown in FIG. 7 could be varied within the scope of the present invention. For instance, the various modes, modules, and elements could be combined, connected differently, or omitted entirely, within the scope of the present invention.

In those instances where navigational information, such as driving directions, are provided to the user, the navigational information may be given in terms most useful to the user. For instance, as discussed above, driving directions in speech format will preferably include street names. The system may provide navigational information employing landmarks where appropriate. Such landmarks may include objects or locations with are visually obvious, known to the user, or otherwise observable by the user. For instance, the system may instruct the user, "Continue four blocks past the Safeway on your right, and merge onto Wolf Road." To provide this capability, information regarding such landmarks is stored, and the processor(s) are configured to retrieve that information and use it in, formulating navigational information.

Similarly, the system may provide navigational information in which distance is measured in terms of stops, blocks, time, or other units that are useful to the user. For instance, the system may instruct the user to "go 2 blocks and turn right on University Avenue" rather than "go 0.3 miles and turn right on University Avenue." Similarly, the system may instruct the user in terms of stops: "continue down Market Street and turn left at the third right onto California Avenue." Likewise, the system may instruct the user in terms of time: "you should reach the ramp for the San Mateo Bridge in twenty seconds." To provide these capabilities, the server processor(s), such as the core engine 450 and/or the intelligent instruction agent 406, are configured and programmed to resolve the relevant information from the available map information, and to generate instructions in the desired format, using programming methods known in the art.

Also, in the case of a user connected to the system over a cellular network, the system in accordance with one embodiment of the present invention may identify the cell-site in which the user is located, and provide only those navigational directions that are applicable while the user is within that cell-site. The system may receive the cell-site identifying information through methods known in the art, such as through information through the user's connection to the server, or through other gateways 312 connected to the system. The logic elements in the server, such as the core engine 450 and/or the intelligent instruction agent 406, are configured and programmed to identify the navigational information that will be applicable while the user is within that cell-site, using methods known in the art.

Similarly, in another embodiment, the system may provide only the navigational information that will be applicable while the user is within a certain area, which may or may not correspond to a wireless cellular cite. For instance, the area may be selected to correspond to the potential error in the determination of the user's location.

Figure 6:
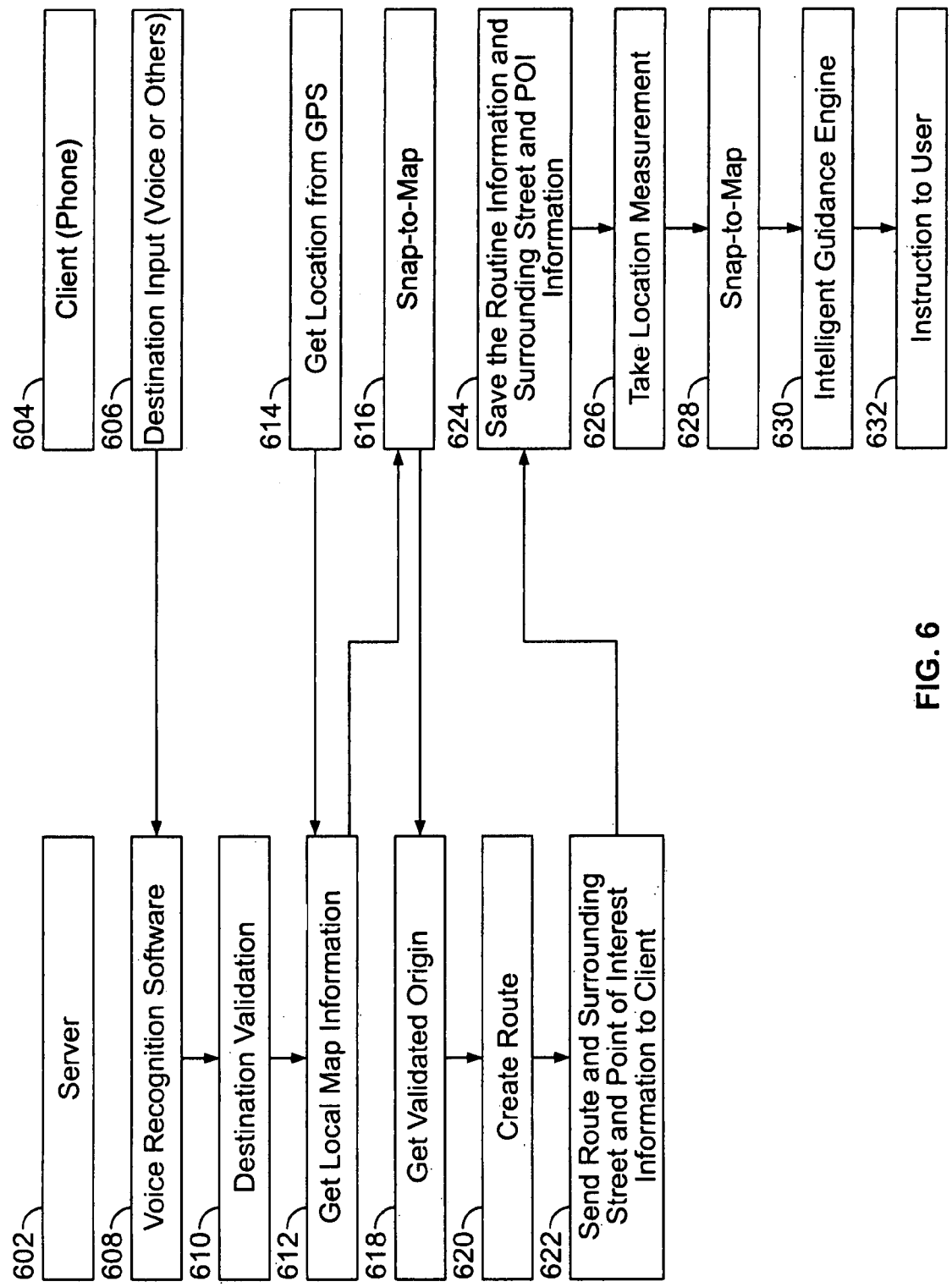
FIG. 6 is schematic flowchart of a method of providing navigational directions in accordance with one embodiment of the present invention.

FIG. 6 generally shows a call flow for the operation of a method of providing navigational information in accordance with one embodiment of the present invention. After connecting with the server 602, the user, through a wireless telephone 604, PDA, or other appliance, provides a destination input 606 to the server 602. In some embodiments, the user may have provided the destination information in advance, either through a wireless connection or through some other connection. The user's destination instruction is received by voice recognition software 608. After processing the user's input, the server provides destination validation 610. The server then obtains local map information 612, as well as measurement information such as GPS information 614. This information is processed in the subprocessor referred to in the preferred embodiment as the Snap to Map processor 616, and/or other subprocessors, to determine the location of the user 618. The server then calculates a nominal route 620 for the user. This route information, as well as surrounding street information and point of interest information, are then provided to the user 622. The information is also saved 624. Typically, the system again collects measurement information 626. That information is processed in the Snap to Map engine 628, and/or the intelligent guidance engine 630. Further instructions 632 are provided to the user, e.g., instructions regarding deviation from the nominal route. Again, the call flow shown in FIG. 6 is merely exemplary, and other variations may be within the scope of the present invention.

As mentioned above, the method shown in FIG. 6, carried out by the elements described elsewhere in this application, may also be used to provide the user with directions to a point of interest. As the user is traveling to an ultimate destination, the user may request directions to some other POI. This POI may take many forms, such as a specific address, a business name, a type of location, etc. For instance, the POI could be a specific location, e.g., "the office" or "Acme Bakery." Or the POI could be a type of location, such as "gas station" or "police station." If the POI is a specific location, the system generates navigational information to direct the user to the POI, and subsequently to the ultimate destination, using the methods and equipment described in this application. If the POI is a category of location, the core engine 450 identifies a subset of potential interim destinations, such as a group of gas stations along the user's route. Among that subset, the system provides the user with directions to one or more interim destinations.

Figure 7:
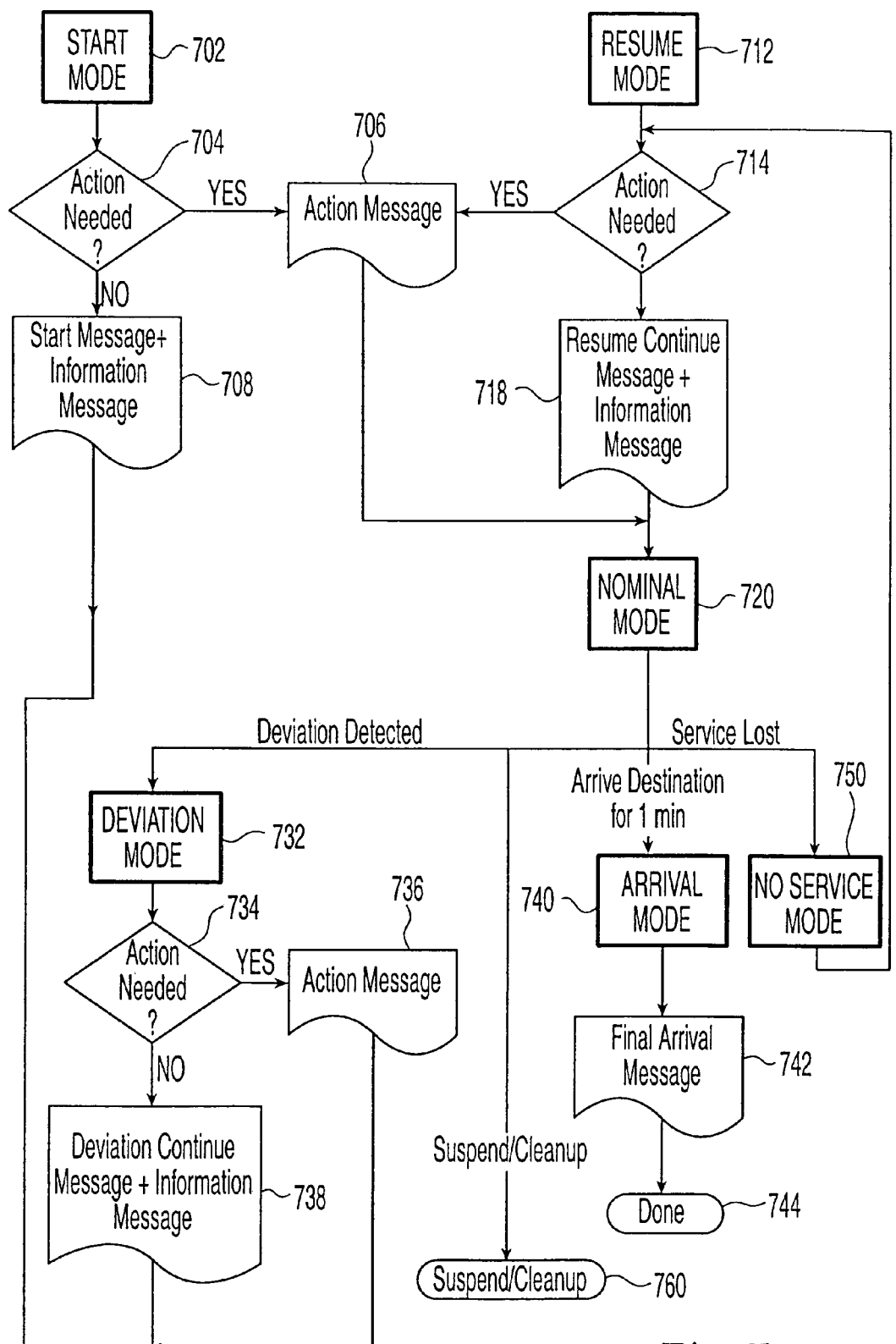
FIG. 7 is a schematic flowchart of a method of providing navigational directions in accordance with one embodiment of the present invention.

FIG. 7 shows a schematic view of a call flow, in broad terms, of a method of providing navigational information in accordance with one embodiment of the present invention, in which the user is instructed or given the option to suspend the connection. This option may be given or taken for a number of reasons. Suspending the connection may conserve the battery or other power source of the user's appliance. If the user's connection is through a service for which the user is charged, suspending the connection can save the user money. In addition, suspending the call may conserve resources for the network(s) through which the connection is made, as well as the resources of the navigational server 212. In some cases, the user will be unable to maintain the connection with the server at certain times during the user's trip due, for instance, to loss of connection with the user's wireless network, or lack of coverage in the user's area by the user's wireless carrier and/or its affiliates. Moreover, there may be long periods between navigational action for the user, and the user may not wish to be connected to the server during these periods. In fact, the system may provide other programming to the user during these or other periods. For instance, the system may play music, advertisement, news, or other programming. Alternatively, the system may provide the user with selected or recorded information, including information pre-selected or pre-recorded by the user.

In this embodiment, the user enters in start mode 702. At this point, the user has already undergone initialization in the system. At step 704, the system determines if action is needed, e.g., if it is time for the user to make a turn or take other action. If so, the system generates an action message for the user instructing the user to take the necessary action at step 706. The user then proceeds into nominal mode 720. If action is not needed at step 704, the system provides the user with a different message 708, such as a welcome message and/or a preparation message informing the user of upcoming action, e.g., "you will be turning left on Wolf road in 25 seconds." The user then proceeds to nominal mode 720.

Alternatively the user may enter in resume mode 712. Again, the system, at step 714, determines if navigational action is needed. If so, the generates the action message instructing the user to take the necessary action at step 706, and the user proceeds to nominal mode 720. If not, the system provides the user with a different message 718, such as a resumption message and/or preparation message regarding upcoming navigational action, and the user proceeds to nominal mode 720.

In the usual case, the user enters resume mode after connecting to the system. The system may recognize that the user has suspended a session, or the user may request to resume a previous trip. In one embodiment, the system recognizes the user's identity information, which comprises various information allowing the system to identify the user, such as account number, telephone number, mobile identification number, ESN, Caller ID, or automatic number identification (ANI). That identity information allows the system to recognize features of the user's account such as a previously suspended session, and historical information regarding that session. In some cases, when a user is requested or instructed to suspend a connection, the user is instructed to resume the connection at a given time. That time may be expressed in a number of ways, such as a given time of day, after a given interval of time, when the user has traveled a certain distance, when the user reaches a certain street or location, when the user has reached a certain landmark, etc. The server's processors, such as the core engine 450 and/or the intelligent instruction agent 406, are preferably configured and programmed to generate such instructions, using methods known in the art. Once the user resumes the connection, the system may retrieve information from the user's suspended session, such as the user's route or expected location, to determine if the user is on the nominal route.

In nominal mode, if the system detects that the user has deviated from the nominal route, the user enters deviation mode 732. The system determines if action is needed in behalf of the user at step 734. If so, the user is given an action message 736 instructing the user to take the required action. If not, the user is given a different message 738, such as a message alerting the user to the deviation and/or upcoming navigational action.

In nominal mode, the system may determine that the user is arriving at the destination. If so, the user enters arrival mode 740, is played a final arrival message 742, and the session ends at step 744. Alternatively, the system may determine that the connection to the user is lost. If so, the user is placed in no service mode 750. Once service is regained, the user is placed in the resume mode flow.

In some circumstances, the system is directed to suspend/cleanup 760. This may occur if the connection to the user is lost, if the user elects to suspend the connection, or for other reasons. In the suspend/cleanup step 760, the system saves information regarding the user and/or the session, for later use if the connection is resumed. The system may also close certain connections on the server, delete information, or take other steps for system housekeeping.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A method for providing navigational information to a user, comprising the steps of:
    establishing a real-time connection with the user;
    receiving the user's location in real time;
    generating navigational information for the user using at least one automated processor; the processor being capable of providing automated navigation information to the user and controlling suspension and re-establishment of the connection with the user;
    providing said navigational information to the user;
    suspending the connection with the user;
    storing trip information regarding the user's position and destination at the time the connection was suspended;
    re-establishing a real-time connection with the user; and
    providing further navigational information to the user, at least partly based on the stored trip information.

2. The method of claim 1, further comprising, after the step of re-establishing a real-time connection with the user, the step of determining if the user's previous trip was suspended.

3. The method of claim 1, further comprising, after the step of re-establishing a real-time connection with the user, the step of querying the user to determine if the user is resuming a suspended call.

4. The method of claim 1, further comprising, before the step of suspending the connection with the user, the step of instructing the user to suspend the call.

5. The method of claim 4, further comprising the step of instructing the user to resume the call.

6. The method of claim 5, wherein said step of instructing the user to resume the call comprises instructing the user to resume the call after a given period of time.

7. The method of claim 6, wherein said step of instructing the user to resume the call comprises instructing the user to resume the call at a given time.

8. The method of claim 6, wherein the step of instructing the user to resume the call comprises instructing the user to resume the call when the user has reached a specified landmark.

9. The method of claim 1, further comprising, after the step of suspending the call to the user, the step of providing the user with non-navigational programming.

10. The method of claim 9, wherein the non-navigational programming comprises music pre-selected by the user.

11. The method of claim 1, wherein the step of providing further navigational information to the user comprises providing navigational information in speech format over a connection comprising a telephone network.

12. The method of claim 1, wherein the step of providing further navigational information to the user comprises providing navigational information in text format.

13. The method of claim 1, wherein the step of providing further navigational information to the user comprises providing navigational information in graphical format.

14. The method of claim 1, wherein the step of providing further navigational information comprises transmitting navigational information over a wireless connection.

15. The method of claim 1, further comprising, prior to the step of suspending the connection with the user, the step of conveying to the user the mileage until the next navigational action required by the user.

16. The method of claim 1, further comprising, prior to the step of suspending the connection with the user, the step of conveying to the user the mileage until the user reaches said destination.

17. The method of claim 1, wherein the step of generating navigational information to the user is fully automated, such that the automated processor can perform the step without assistance from a human operator.

18. The method of claim 1, wherein the step of providing navigational information to the user is fully automated, such that the automated processor can perform the step without assistance from a human operator.

19. The method of claim 1, wherein the step of generating navigational information to the user and the step of providing navigational information to the user are fully automated, such that the automated processor can perform the steps without assistance from a human operator.

20. A method of providing wireless telephone service to a plurality of subscribers, comprising the steps of:
    establishing a real-time connection with the subscriber at least in part through a wireless telephone network;
    receiving the subscriber's location in real time;
    generating navigational information for the subscriber using at least one automated processor; the processor being capable of providing automated navigation information to the user and controlling suspension and re-establishment of the connection with the user;
    providing said navigational information to the subscriber;
    suspending the connection with the subscriber;
    storing trip information regarding the subscriber's position and destination at the time the connection was suspended;
    re-establishing a real-time connection with the subscriber; and
    providing further navigational information to the subscriber, at least partly based on the stored trip information.

21. A system for providing location information to a user, comprising:
    an interface communicating with the user over a communications network;
    an automated processor connected to the interface and configured to generate navigational information based at least in part on information received from the user; the processor being capable of providing automated navigation information to the user and controlling suspension and re-establishment of the connection with the user;
    said automated processor configured to suspend interaction with the user and to later resume interaction with the user;
    a storage device connected to the processor and configured to store user information, said user information comprising location and destination information for the user;
    a transmission device connected to a network, through which the generated navigational information is conveyed to the user.

22. The system of claim 21, said user information further comprising the location of the user at the time the processor suspended interaction with the user.

23. The system of claim 21, said storage device comprising a database of user information, said database comprising an indication of whether the user has suspended a call for a trip.

24. The system of claim 23, said database further comprising resumption information, said resumption information comprising the user's expected location upon resumption of interaction with the user.

25. A wireless telephone system providing service to a plurality of users, comprising:
- an interface communicating with the user over a communications network;
- an automated processor connected to the interface and configured to generate navigational information based at least in part on information received from the user; the processor being capable of providing automated navigation information to the user and controlling suspension and re-establishment of the connection with the user;
- said automated processor configured to suspend interaction with the user and to later resume interaction with the user;
- a storage device connected to the processor and configured to store user information, said user information comprising location and destination information for the user; and
- a transmission device connected to a network, through which the generated navigational information is conveyed to the user.

26. A system for providing navigational information to a user, comprising:
- interface means for communicating with the user over a communications network;
- automated processor means for generating navigational information based at least in part on information received from the user; the processor being capable of providing automated navigation information to the user and controlling suspension and re-establishment of the connection with the user;
- suspension means for suspending interaction with the user and to later resume interaction with the user;
- storage means for storing user information, said user information comprising location and destination information for the user;
- transmission means for conveying the generated navigational information to the user.

* * * * *